(12) United States Patent
Wang et al.

(10) Patent No.: US 12,182,631 B2
(45) Date of Patent: Dec. 31, 2024

(54) CONTAINER FRAMEWORK FOR USER-DEFINED FUNCTIONS

(71) Applicant: PIVOTAL SOFTWARE, INC., Palo Alto, CA (US)

(72) Inventors: Haozhou Wang, Beijing (CN); Jiang Wu, Beijing (CN); Gang Guo, Beijing (CN); Shaoqi Bai, Beijing (CN); Huan Zhang, Beijing (CN)

(73) Assignee: PIVOTAL SOFTWARE, INC., Palo Alto, CA (US)

( * ) Notice: Subject to any disclaimer, the term of this patent is extended or adjusted under 35 U.S.C. 154(b) by 704 days.

(21) Appl. No.: 17/261,842

(22) PCT Filed: Jul. 20, 2018

(86) PCT No.: PCT/CN2018/096362
§ 371 (c)(1),
(2) Date: Jan. 20, 2021

(87) PCT Pub. No.: WO2020/014939
PCT Pub. Date: Jan. 23, 2020

(65) Prior Publication Data
US 2021/0303371 A1 Sep. 30, 2021

(51) Int. Cl.
*G06F 16/00* (2019.01)
*G06F 9/50* (2006.01)
(Continued)

(52) U.S. Cl.
CPC .......... *G06F 9/5083* (2013.01); *G06F 9/5077* (2013.01); *G06F 16/2448* (2019.01);
(Continued)

(58) Field of Classification Search
CPC .. G06F 9/5083; G06F 9/5077; G06F 16/2448; G06F 16/2457; G06F 16/2471;
(Continued)

(56) References Cited

U.S. PATENT DOCUMENTS 7,996,387 B2 * 8/2011 Das .................. G06F 16/22
707/718
10,771,584 B2 * 9/2020 Shimamura ........... G06F 9/5072
(Continued)

FOREIGN PATENT DOCUMENTS

WO    WO 2013/091195    6/2013

OTHER PUBLICATIONS

PCT International Search Report and Written Opinion in International Appln. No. PCT/CN2018/096362, dated Apr. 24, 2019, 9 pages.
(Continued)

*Primary Examiner* — Debbie M Le
(74) *Attorney, Agent, or Firm* — King Intellectual Asset Management (57) ABSTRACT

Methods, systems, and computer programs encoded on computer storage media, for processing user-defined functions in containers. One example system receives a query written in a primary query language that calls a user-defined function. The system assigns primary segment hosts to process portions of the query written in the primary query language and assigns first containers to process the call to the user-defined function. The primary segment hosts provide to the first containers the user-defined function and one or more arguments in the call to the user-defined function. The first containers execute the user-defined function. The primary segment hosts receive an initial result of the call to the user-defined function computed by the first containers. The primary segment hosts compute a final result of the query using the initial result. The primary segment hosts provide the final result of the query in response to receiving the query.

23 Claims, 3 Drawing Sheets

(51) Int. Cl.
　　　*G06F 16/242*　　　(2019.01)
　　　*G06F 16/2457*　　(2019.01)
　　　*G06F 16/2458*　　(2019.01)
　　　*G06F 16/27*　　　(2019.01)
(52) U.S. Cl.
　　　CPC ...... *G06F 16/2457* (2019.01); *G06F 16/2471* (2019.01); *G06F 16/27* (2019.01); *G06F 2209/5011* (2013.01); *G06F 2209/503* (2013.01)
(58) Field of Classification Search
　　　CPC ............. G06F 16/27; G06F 2209/5011; G06F 2209/503; G06F 16/245
　　　See application file for complete search history.

(56) References Cited

U.S. PATENT DOCUMENTS

| | | | | |
|---|---|---|---|---|
| 11,099,841 | B2* | 8/2021 | Grosse | G06F 16/24532 |
| 11,216,454 | B1* | 1/2022 | Cole | G06F 8/30 |
| 2012/0130963 | A1 | 5/2012 | Luo et al. | |
| 2012/0191642 | A1 | 7/2012 | George | |
| 2015/0269234 | A1* | 9/2015 | Castellanos | G06F 16/254 |
| | | | | 707/602 |
| 2017/0097970 | A1 | 4/2017 | Bendel et al. | |
| 2017/0371703 | A1 | 12/2017 | Wagner et al. | |

OTHER PUBLICATIONS

European Patent Office, Examination Report—Communication Pursuant to Article 94(3) EPC for European Patent Application No. 18926515.0-1203, dated Jan. 27, 2023.
Anonymous: "Partition and Clustering Guide—Db2 Version 11.1", IBM Corp., Apr. 1, 2018, http://public.dhe.ibm.com/ps/products/db2/info/vr111/pdf/en_US/partitionbook.pdf.
Anonymous: "Configuration Parameters—Db2 Version 11.1", IBM Corp., Apr. 1, 2018, http://public.dhe.ibm.com/ps/products/db2/info/vr111/pdf/en_US/configbook.pdf.
Anonymous: "Db2 Version 11.1 for Linux, UNIX, and Windows English Manuals", IBM Corp., Apr. 1, 2018, https://www.ibm.com/support/pages/db2-version-111-linux-unix-and-windows-english-manuals.
IBM 7: "Database SQL Programming—IBM i 7.1", Apr. 1, 2015, https://www.ibm.com/docs/en/ssw_ibm_i_71/sqlp/rbafy.pdf.
Anonymous: "Parallel database—Wikipedia", Nov. 16, 2016, https://web.archive.org/web/20161116072332/https://en.wikipedia.org/wiki/Parallel_database.
Anonymous: "Parallel Processing & Parallel Databases", Dec. 1, 2016, https://web.archive.org/web/20161201193903/https://docs.oracle.com/cd/A58617_01/server.804/a58238/ch1_unde.htm.
EP Search Report in European Appln. No. 18926515.0, dated Dec. 15, 2021, 9 pages.
Godfrey et al., "Secure and portable database extensibility," Sigmod Record, ACM, Jun. 1998, 27(2):390-401, 12 pages.
Meier et al., "Debugging DB2/CS Client/Server Applications," IBM Systems Journal, IBM Corp., 1997, 36(1):88-101.
European Summons, European Application No. 18926515.0 dated Dec. 28, 2023, 15 pages.
IBM 7: "Database SQL programming—IBM i 7.1", Apr. 1, 2015, XP093016240, Retrieved from the Internet: https://www.ibm.com/docs/en/ssw_ibm_i_71/sqlp/rbafy.pdf, 508 pages.
"Parallel database—Wikipedia", Nov. 16, 2016, XP093016298, Retrieved from the Internet: https://web.archive.org/web/20161116072332/https://en.wikipedia.org/wiki/Parallel_database, 2 pages.
"Parallel Processing & Parallel Databases", Dec. 1, 2016. XP093016303, Retrieved from the Internet: https://web.archive.org/web/20161201193903/https://docs.oracle.com/cd/A58617_01/server.804/a58238/ch1_unde.htm, 14 pages.
"Thread pool—Wikipedia", Jul. 28, 2017, XP093112202, Retrieved from the Internet: https://web.archive.org/web/20170728040340/https://en.wikipedia.org/wiki/Thread_pool, 4 pages.
"Object pool pattern—Wikipedia", Jul. 20, 2017, XP093112212, Retrieved from the Internet: https://web.archive.org/web/20170720111233/https://en.wikipedia.org/wiki/Object_pool_pattern, 8 pages.
"Partition and Clustering Guide—Db2 Version 11.1", Apr. 1, 2018, XP093016230, Retrieved from the Internet: http://public.dhe.ibm.com/ps/products/db2/info/vr111/pdf/en_US/partitionbook.pdf, 108 pages.
"Configuration Parameters—Db2 Version 11.1", Apr. 1, 2018, XP093016232, Retrieved from the Internet: https://public.dhe.ibm.com/ps/products/db2/info/vr111/pdf/en_US/configbook.pdf, 294 pages.
"Db2 Version 11.1 for Linux, UNIX, and Windows English Manuals", Apr. 1, 2018, XP093016234, Retrieved from the Internet: https://www.ibm.com/support/pages/db2-version-111-linux-unix-and-windows-english-manuals, 3 pages.
Michael Godfrey et al: "Secure and portable database extensibility", SIGMOD Record, ACM, vol. 27, No. 2, Jun. 1998, pp. 390-401, XP058358431, ISSN: 0163-5808, DOI: 10.1145/276305.276339, 12 pages.
Meier et al: "Debugging DB2/CS Client/Server Applications", IBM Systems Journal, IBM Corp, vol. 36, No. 1, 1997, pp. 88-101, XP000685710, ISSN: 0018-8670, 14 pages.

\* cited by examiner

CONTAINER FRAMEWORK FOR USER-DEFINED FUNCTIONS

CROSS REFERENCES TO RELATED APPLICATIONS

This application is a national phase under 35 U.S.C. § 371 of PCT/CN2018/096362, filed Jul. 20, 2018, by Haozhou Wang et a.

BACKGROUND

This specification relates to database systems.

Databases organize data into tables of columns and rows. A unique key identifies each row in each table. A particular row represents an instance of a particular entity, and the columns in that row store values attributed to the instance. Rows in one table can be linked to rows in another table by including in one of the two tables a column for the unique key of the linked row.

Databases can be partitioned into multiple segments. The segments are queried by respective segment instances, which are computer programs that are executed by physical or virtual computing nodes referred to as segment nodes. Each segment node has its own storage and processing power. Each segment instance, at the direction of a master, can process a portion of a query from a client. The master can collect the results from each segment instance and return a final result to the client.

Users can write database queries in query languages. Query languages are computer programming languages that can be used to create and update databases and to retrieve from and manipulate data in those databases. Query languages typically include a set of defined operations to support this functionality. Generally, the segment instances of a particular database are specifically configured to process queries in a particular query language. This specification refers to these particular query languages as primary query languages.

In addition to using pre-defined operations in primary query languages, database users can create and use custom functions written in the primary query language. Some databases can also process queries that include functions written in auxiliary programming languages, which are programming languages that are different from the primary query languages of those databases. This specification refers to such custom functions and functions written in auxiliary programming languages as user-defined functions. Although some databases can process user-defined functions, doing so can be inefficient. That is, executing user-defined functions can consume a disproportionate amount of computing resources, e.g., memory or processing power, relative to executing queries written in a primary query language, which can disrupt normal operation of the database for other users. Additionally, user-defined functions may not be fully tested and can include malicious code that can disable databases or corrupt data.

SUMMARY

This specification describes a distributed database system implemented on a cloud computing platform that can process user-defined functions in isolated containers. Containers are isolated user-space instances that are implemented through operating-system level virtualization. Containers share computing resources, e.g., memory or processing power, of the respective computing systems that host the containers. Computing systems can dynamically adjust computing resource allocations between containers.

The database system can receive a query from a client device. The query can be written in a primary query language that supports calls to user-defined functions that may be written in other programming languages. If the query is written entirely in the primary query language and does not contain a call to a user-defined function, one or more segment instances implemented by one or more primary segment hosts can process the query in its entirety. The primary segment hosts can be physical or virtual computing nodes. For example, the primary segment hosts can be physical computers, virtual machines, containers, or some combination of the three.

If the query includes a call to a user-defined function, the system can assign one or more containers to process the user-defined function. This specification refers to these assigned containers as UDF containers.

The UDF containers are distinct from the primary segment hosts. That is, the UDF containers are not primary segment hosts, and the primary segment hosts are not and do not implement UDF containers. The system can isolate the UDF containers from the primary segment hosts, e.g., by allocating separate computing resources to the UDF containers.

The system can specially configure the UDF containers to process the user-defined function. For example, the system can configure each UDF container to have a library that defines operations in the auxiliary programming language in which the user-defined function is written. Such a library can facilitate efficient execution of the user-defined function.

After the system assigns and initializes the UDF containers, the system can instruct the primary segment hosts to provide the user-defined function and one or more database segments to the UDF containers. The UDF containers can then process the user-defined function, e.g., by retrieving particular data from the database segments. When execution of the user-defined function is complete, the UDF containers can provide a result to the primary segment hosts. Thereafter, the primary segment hosts can forward the result to the client device that sent the query.

The subject matter described in this specification can be implemented in particular embodiments so as to realize one or more of the following advantages. The system described herein can more efficiently and safely process user-defined functions in isolated UDF containers than on primary segment hosts.

User-defined functions often use computing resources inefficiently. This is because database systems are generally optimized to process queries written in a particular query language. Executing user-defined functions in isolated UDF containers with separate computing resources ensures that the user-defined functions do not use all of the database's computing resources. This reduces the occurrence of overload events, which can impact query speed and consistency.

The UDF containers can additionally include libraries that define operations in auxiliary programming languages. This allows the system to process queries having calls to user-defined functions written in those auxiliary programming languages without reconfiguring the segment instances of the database, or without translating operations defined in the auxiliary programming languages into statements of the primary query language, which can be a time-intensive process.

User-defined functions can also include malicious or buggy code that can cripple a database or corrupt its data. The system can mitigate the risks of malicious code by executing user-defined functions in isolated UDF containers that do not have access to the segment instances or database segments on the primary segment hosts. Consequently, the malicious code cannot interfere with normal operations of the database. Because the UDF containers are isolated from the database system, they also prevent user-defined functions from accessing unauthorized file systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
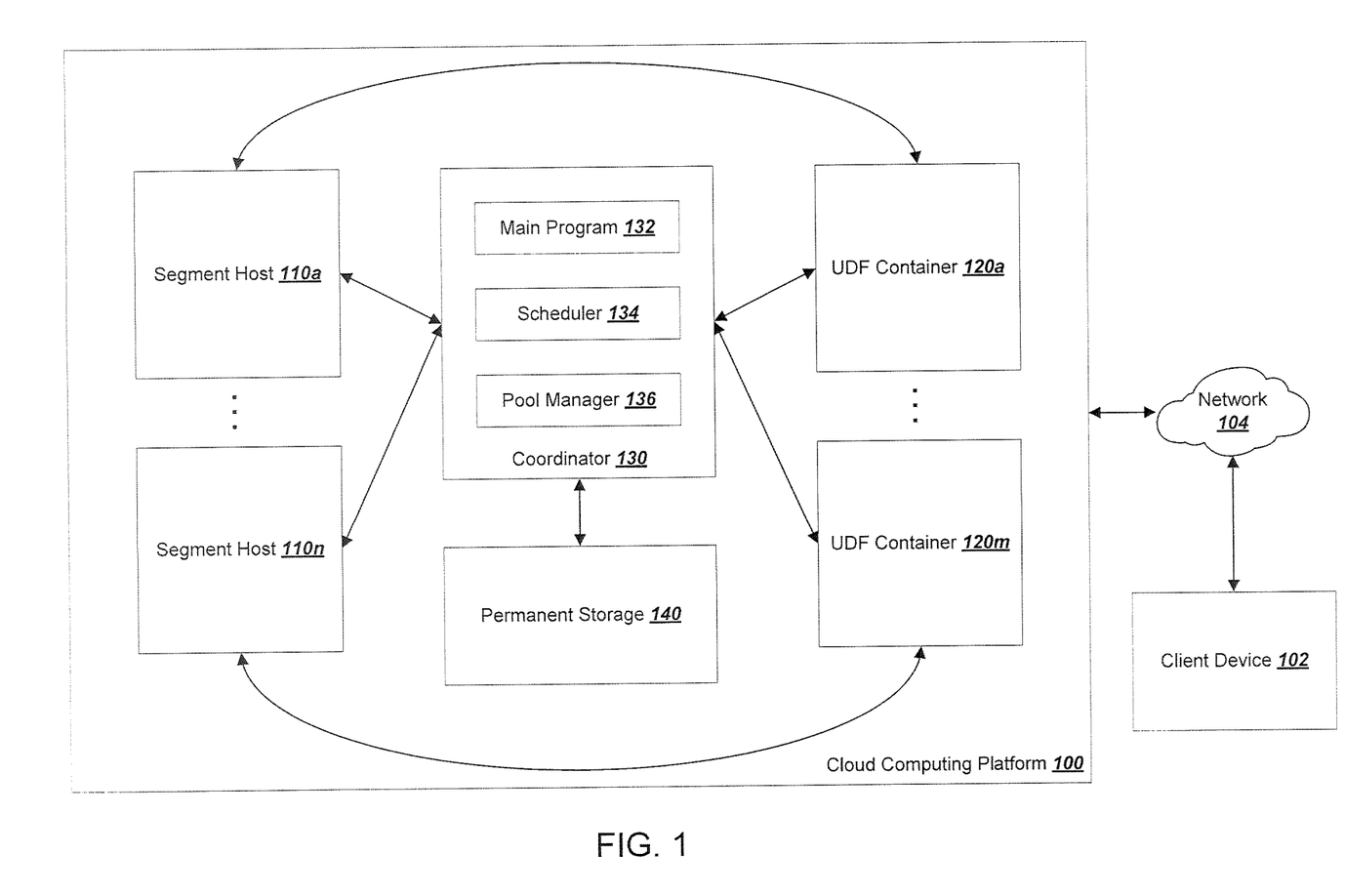
FIG. 1 is a diagram of an example cloud computing platform.

FIG. 1 is a diagram of an example cloud computing platform 100. The cloud computing platform 100 provides computing resources and services, including physical computers, virtual machines, containers, and software, that can implement a distributed database.

Client devices, including a client device 102, can access the database implemented on the cloud computing platform 100 over a wired or wireless network 104. The network 104 can be a local area network (LAN) that connects computers in a limited area such a residence, school, laboratory, or office building. LANs include Ethernet and Wi-Fi networks. The network can also be a larger network, including a wide area network (WAN) or the Internet. The client device 102 can create, update, or query the database.

The cloud computing platform 100 includes one or more primary segment hosts 110a-110n. The primary segment hosts 110a-110n are computing resources, e.g., physical computers, virtual machines, containers, or some combination of these, that implement one or more segment instances of the database. In some implementations, each primary segment host is a physical computer or virtual machine that hosts multiple containers. In such an implementation, each container implements a respective segment instance of the database. In this specification, these containers are referred to as primary containers.

As mentioned above, containers are isolated user-space instances that are implemented through operating-system-level virtualization. Containers share computing resources of their respective computing systems. Computing systems can dynamically adjust computing resource allocations between containers, and can allocate different levels of computing resources to different containers running on the same physical computer.

The primary containers are responsible for implementing segment instances that process queries written in primary query languages.

The cloud computing platform 100 also includes one or more UDF containers 120a-120m that can process user-defined functions. A user-defined function is a function called by a query written in a primary query language and is a function whose definition is specified by user input. In other words, user-defined functions are not built-in functions of the primary query language. User-defined functions can be defined with statements in a different, auxiliary programming language. The UDF containers 120a-120m provide an isolated computing environment in which to safely process such user-defined functions.

The UDF containers 120a-120m can have libraries that define operations in auxiliary programming languages. These libraries facilitate efficient processing of user-defined functions written in those auxiliary programming languages. A coordinator 130, which will be described in more detail below, can also allocate additional computing resources to the UDF containers 120a-120m without reducing the amount of computing resources allocated to the primary containers.

The cloud computing platform 100 also includes a coordinator 130. The coordinator 130 can receive queries from client devices, create query plans, and manage the primary segment hosts 110a-110n and the UDF containers 120a-120m.

When the coordinator 130 receives a query from the client device 102, the coordinator 130 creates a distributed query plan according to a main program 132. The main program 132 defines how database queries should be processed. The main program 132 can also define how resources should be allocated between different primary containers hosted on the primary segment hosts 110a-110n. The coordinator 130 sends the query plan to the segment hosts 110a-110n. If the query is written entirely in a primary query language, the segment instances can process the query plan in its entirety.

If the query instead includes a call to a user-defined function written in an auxiliary programming language, the coordinator 130 can additionally assign one or more UDF containers to process the call to the user-defined function. Generally, the coordinator 130 assigns UDF containers in response to a request from one or more primary containers that implement the segment instances of the database. The segment instances can recognize that the query includes a user-defined function based on one or more identifiers in the query. In response to the request, the coordinator 130 assigns one or more UDF containers to process the user-defined function. In some implementations, the coordinator 130 assigns one UDF container per primary container that made the request. In other implementations, the coordinator assigns one UDF container per user-defined function, or one UDF container per task in the user-defined function. After the coordinator 130 assigns and initializes the UDF containers, the primary containers can pass the user-defined function and any database segments required to process the user-defined function to the UDF containers. The UDF containers can then process the user-defined function.

As an example, the system can receive a query written in the Python programming language that includes the following function:

defsquared(s):
return s * s
sqlContext.udf.register(squaredWithPython, squared)

This function is a user-defined function because it is not a built-in function in the primary query language. Instead, a user had to write and define the function in Python, an auxiliary programming language. The segment instances can classify this function as a user-defined function based on the fact that it is written in the auxiliary programming language, or based on the fact that is explicitly registered as a user-defined function, as indicated in the last line of code. Thereafter, the primary containers that implement the segment instances can request that the coordinator 130 provide UDF containers in which to process the user-defined function. The coordinator 130 can then assign one or more UDF containers that are configured to process user-defined functions written in Python.

The coordinator 130 also includes a scheduler 134. The scheduler 134 can select primary segment hosts to host unscheduled segment instances. To do so, the scheduler 134 can track the resource utilization of each primary segment host to ensure that workload is not scheduled in excess of available computing resources. The scheduler 134 can also select computing resource allocations for primary containers based on policy directives defined in the main program 132. The coordinator 130 can communicate with the primary segment hosts to carry out those resource allocation decisions. For example, the coordinator 130 can instruct the primary segment hosts to create or delete containers, or to modify computing resource allocations between containers.

The coordinator 130 also includes a pool manager 136. The pool manager 136 can manage a pool of containers that are available to be used as UDF containers. The pool manager 136 can promote available containers to be active UDF containers when the coordinator 130 receives requests from the primary containers. The pool manager 136 performs functions similar to the scheduler 134, but for the UDF containers instead of the primary containers.

The cloud computing platform 100 also includes a permanent storage 140. The permanent storage 140 can store back-up copies of database segments, ensuring high-availability of the database. The permanent storage 140 can also store the configuration of database data in the primary segment hosts 110*a*-110*n* of the database. In other words, the permanent storage 140 can specify which segment hosts store which database segments. More specifically, it can specify which containers execute which segment instances. Changes in the configuration of data in the segment hosts are reflected in the permanent storage 140. For example, certain segment instances might be exchanged between primary segment hosts or between containers. Such a change would be reflected in the permanent storage 140. The permanent storage 140 can similarly store the configuration of the UDF containers 120*a*-120*m*. The permanent storage 140 can also store the user-defined function in case of a failure of a UDF container. If an assigned UDF container does fail, the coordinator 130 can assign a new UDF container to replace it.

The permanent storage 140 can be implemented as one or more RAID arrays that provide high-availability storage. RAID arrays are made of multiple independent storage disks that provide some combination of read and/or write speed, redundancy, and increased storage space.

Figure 2:
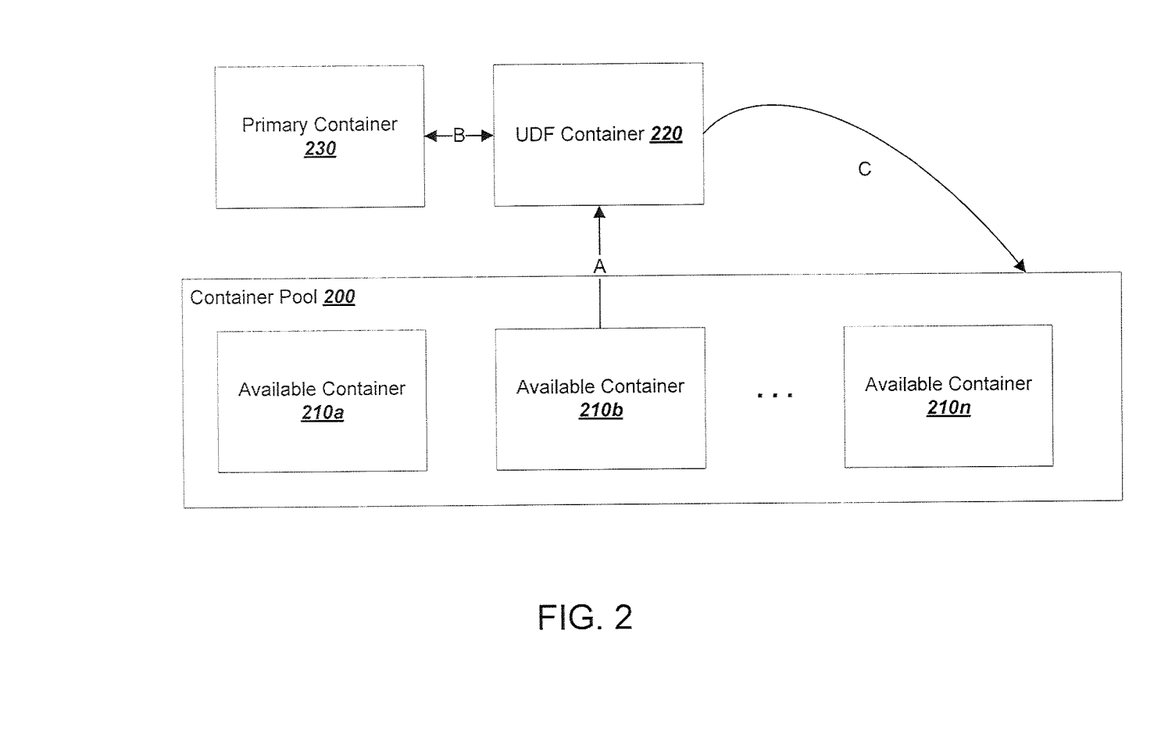
FIG. 2 is a diagram of an example container pool.

FIG. 2 is a diagram of an example container pool 200. The container pool 200 includes one or more available containers 210*a*-210*n*. The available containers 210*a*-210*n* do not actively process user-defined functions.

If the coordinator 130 receives a request to process a user-defined function from a primary container, e.g., the primary container 230, the coordinator 130 can check the container pool 200 to see if it has any available containers. If it does, the coordinator 130 can assign an available UDF container, e.g., the UDF container 220, to the primary container that made the request (step A). The primary container and the assigned UDF container can connect (step B), and the primary container can provide the user-defined function and database data to the UDF container so that the UDF container can process the user-defined function. Although FIG. 2 depicts only a single primary container and a single UDF container, this process can be performed for each primary container that makes a request to process a user-defined function.

The coordinator 130 can reallocate computing resources, e.g., memory and processing power, between available containers and assigned UDF containers as required. For example, the coordinator 130 can allocate fewer computing resources to available containers than to assigned UDF containers. When the coordinator 130 assigns an available container, it can allocate additional computing resources to that assigned container. In some cases, assigned UDF containers may require additional computing resources. In such cases, the coordinator 130 can destroy an available container and reallocate computing resources from the destroyed container to the assigned UDF containers. The coordinator 130 can also add additional containers to the container pool 200 if, for example, computing resource utilization of assigned UDF containers and available containers does not exceed a limit.

After the UDF container 220 processes the user-defined function and provides a result to the primary container 230, the coordinator 130 can deactivate the UDF container 220 and add it back to the container pool 200 (step C).

The coordinator 130 can initialize a number of UDF containers prior to the distributed database system receiving a query to reduce latency when a primary container requests a UDF container.

Figure 3:
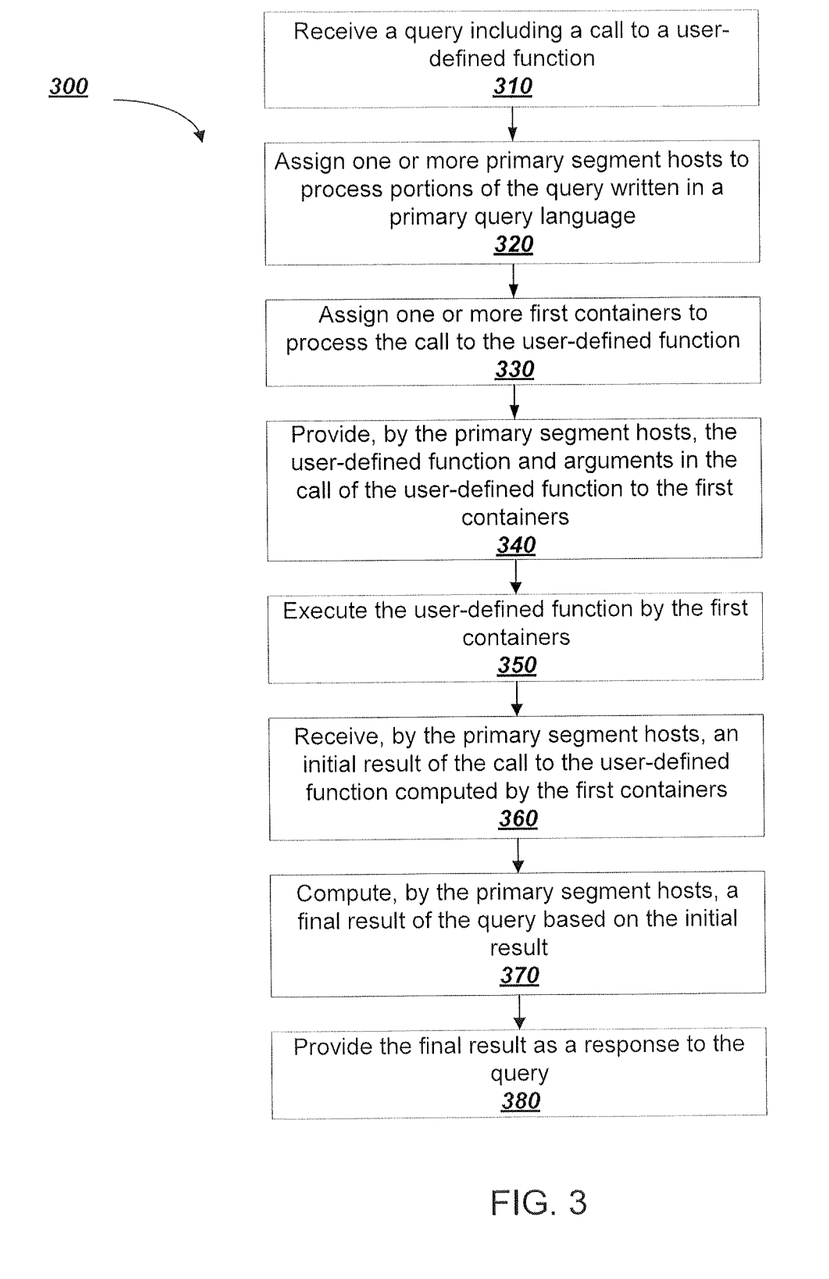
FIG. 3 is a flow chart of an example process for executing user-defined functions in isolated containers.

FIG. 3 is a flow chart of an example process 300 for executing a user-defined function in one or more isolated UDF containers. For convenience, the process will be described as being performed by a distributed database system on a cloud computing platform, or by one or more components of the distributed database system. The distributed database system includes the components described in reference to FIG. 1.

The system receives a query written in a primary query language (310). The query includes a call to a user-defined function. The user-defined function is a function that is not explicitly defined in the primary query language, but is instead written and defined by a user. The user-defined function can be defined by an auxiliary programming language that is different from the primary query language in which the query is written.

The system assigns one or more primary segment hosts to process one or more portions of the query written in the primary query language (320). In some implementations, the primary segment hosts are primary containers. In such implementations, the primary containers each implement a segment instance that can process a portion of the query.

The system also assigns one or more UDF containers to process the call to the user-defined function (330). Generally, the system assigns the one or more UDF containers in response to a request from one or more primary containers that received the portion of the query including the user-defined function. The system can assign a UDF container to each primary container that made a request.

Assigning the UDF containers to process the call to the user-defined function can involve selecting the UDF containers from a pool of available containers. In particular, assigning the UDF containers to process the call to the user-defined function can involve identifying and selecting containers that are specifically configured to process functions in the auxiliary programming language in which the user-defined function is written. For example, if the user-defined function is written in Python, the system can assign UDF containers that are configured to include Python libraries, which would help facilitate execution of the user-defined function.

The assigned UDF containers are isolated from the primary containers on the primary segment hosts. That is, the UDF containers do not share computing resources with the primary containers.

The primary segment hosts provide the user-defined function and one or more arguments in the call to the user-defined function to the UDF containers (340). The arguments in the call to the user-defined function can include the database segments that the user-defined function will operate on.

The UDF containers execute the user-defined function using the arguments to the call in the user-defined function, e.g., using the database segments in the call (350). While the UDF containers execute the user-defined function, the segment instances implemented by the primary segment hosts process the other portions of the query, e.g., the portions of the query that are written in the primary query language and that do not include user-defined functions.

After the UDF containers process the user-defined function, the primary segment hosts receive an initial result of the call to the user-defined function computed by the UDF containers (360). The primary segment hosts compute a final result of the query using the initial result (370) and provide the final result of the query in response to receiving the query (380).

Upon providing an initial result of executing the call to the user-defined function to the primary segment hosts, the system can release the UDF containers to the pool of available containers.

Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving, by a distributed database system installed on a cloud computing platform, a query written in a primary query language, wherein the query calls a user-defined function;
assigning, one or more primary segment hosts on the cloud computing platform to process one or more portions of the query written in the primary query language;
assigning one or more first containers to process the call to the user-defined function in the query;
providing, by the one or more primary segment hosts to the one or more first containers assigned to process the call to the user-defined function, the user-defined function and one or more arguments in the call to the user-defined function;
executing, by the one or more first containers assigned to process the call to the user defined function, the user-defined function using the arguments to the call in the user-defined function;
receiving, by the one or more primary segment hosts, an initial result of the call to the user-defined function computed by the one or more first containers;
computing, by the one or more primary segment hosts, a final result of the query using the initial result of the call to the user-defined function; and providing the final result of the query in response to receiving the query.

Embodiment 2 is the method of embodiment 1, wherein assigning the first containers to process the call to the user-defined function comprises:
selecting the first containers from a pool of available containers.

Embodiment 3 is the method of embodiment 2, further comprising:
upon providing an initial result of executing the call to the user-defined function to the primary segment hosts, releasing the first containers to the pool of available containers.

Embodiment 4 is the method of any of embodiments 2-3, further comprising:
removing a respective container from the pool of available containers when resource utilization of the first containers exceeds a limit; and
reallocating resources from the removed container to the first containers.

Embodiment 5 is the method of any of embodiments 2-4, wherein one or more containers in the pool of available containers are initialized prior to the distributed database system receiving the query.

Embodiment 6 is the method of any of embodiments 2-5, further comprising:
adding a container to the pool of available containers when resource utilization of the first containers and available containers does not exceed a limit.

Embodiment 7 is the method of any of embodiments 1-6, further comprising:
storing the user-defined function and database segments in permanent storage in case of failure of one of the first containers.

Embodiment 8 is the method of any of embodiments 1-7, further comprising:
assigning a new container to replace a failed first container.

Embodiment 9 is the method of any of embodiments 1-8, wherein the first containers do not share computing resources with the primary segment hosts.

Embodiment 10 is the method of any of embodiments 1-9, wherein the user-defined function is written in an auxiliary programming language that is different from the primary query language.

Embodiment 11 is the method of embodiment 10, wherein assigning the one or more first containers to process the call to the user-defined function comprises identifying one or more first containers that are configured to process functions in the auxiliary programming language.

Embodiment 12 is a system comprising: one or more computers and one or more storage devices storing instructions that are operable, when executed by the one or more computers, to cause the one or more computers to perform the method of any one of embodiments 1-11.

Embodiment 13 is one or more computer storage media storing instructions that are operable, when executed by one or more computers, to cause the one or more computers to perform the method of any one of embodiments 1-11.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising:
one or more computers and one or more storage devices storing instructions, that when executed by the one or more computers, cause the one or more computers to perform operations comprising:
receiving, by a distributed database system installed on a cloud computing platform, a query written in a primary query language, wherein the query calls a user-defined function;
assigning one or more primary segment hosts on the cloud computing platform to process one or more portions of the query written in the primary query language;
assigning one or more first containers to process the call to the user-defined function in the query;
providing, by the one or more primary segment hosts to the one or more first containers assigned to process the call to the user-defined function, the user-defined function and one or more arguments in the call to the user-defined function;
executing, by the one or more first containers assigned to process the call to the user defined function, the user-defined function using the arguments to the call in the user-defined function;
receiving, by the one or more primary segment hosts, an initial result of the call to the user-defined function computed by the one or more first containers;
computing, by the one or more primary segment hosts, a final result of the query using the initial result of the call to the user-defined function; and
providing the final result of the query in response to receiving the query.

2. The system of claim 1, wherein assigning the first containers to process the call to the user-defined function comprises:
selecting the first containers from a pool of available containers.

3. The system of claim 2, wherein the operations further comprise:
upon providing an initial result of executing the call to the user-defined function to the primary segment hosts, releasing the first containers to the pool of available containers.

4. The system of claim 2, wherein the operations further comprise:
removing a respective container from the pool of available containers when resource utilization of the first containers exceeds a limit; and
reallocating resources from the removed container to the first containers.

5. The system of claim 2, wherein one or more containers in the pool of available containers are initialized prior to the distributed database system receiving the query.

6. The system of claim 2, wherein the operations further comprise:
adding a container to the pool of available containers when resource utilization of the first containers and available containers does not exceed a limit.

7. The system of claim 1, wherein the operations further comprise:
storing the user-defined function and database segments in permanent storage in case of failure of one of the first containers.

8. The system of claim 1, wherein the operations further comprise:
assigning a new container to replace a failed first container.

9. The system of claim 1, wherein the first containers do not share computing resources with the primary segment hosts.

10. The system of claim 1, wherein the user-defined function is written in an auxiliary programming language that is different from the primary query language.

11. The system of claim 10, wherein assigning the one or more first containers to process the call to the user-defined function comprises identifying one or more first containers that are configured to process functions in the auxiliary programming language.

12. A method comprising:
receiving, by a distributed database system installed on a cloud computing platform, a query written in a primary query language, wherein the query calls a user-defined function;
assigning one or more primary segment hosts on the cloud computing platform to process one or more portions of the query written in the primary query language;
assigning one or more first containers to process the call to the user-defined function in the query;
providing, by the one or more primary segment hosts to the one or more first containers assigned to process the call to the user-defined function, the user-defined function and one or more arguments in the calf to the user-defined function;
executing, by the one or more first containers assigned to process the call to the user defined function, the user-defined function using the arguments to the call in the user-defined function;
receiving, by the one or more primary segment hosts, an initial result of the call to the user-defined function computed by the one or more first containers;
computing, by the one or more primary segment hosts, a final result of the query using the initial result of the call to the user-defined function; and
providing the final result of the query in response to receiving the query.

13. The method of claim 12, wherein assigning the first containers to process the call to the user-defined function comprises:
selecting the first containers from a pool of available containers.

14. The method of claim 13, further comprising:
upon providing an initial result of executing the call to the user-defined function to the primary segment hosts, releasing the first containers to the pool of available containers.

15. The method of claim 13, further comprising:
removing a respective container from the pool of available containers when resource utilization of the first containers exceeds a limit; and
reallocating resources from the removed container to the first containers.

16. The method of claim 13, wherein one or more containers in the pool of available containers are initialized prior to the distributed database system receiving the query.

17. The method of claim 13, further comprising:
adding a container to the pool of available containers when resource utilization of the first containers and available containers does not exceed a limit.

18. The method of claim 12, further comprising:
storing the user-defined function and database segments in permanent storage in case of failure of one of the first containers.

19. The method of claim 12, further comprising:
assigning a new container to replace a failed first container.

20. The method of claim 12, wherein the first containers do not share computing resources with the primary segment hosts.

21. The method of claim 12, wherein the user-defined function is written in an auxiliary programming language that is different from the primary query language.

22. The method of claim 21, wherein assigning the one or more first containers to process the call to the user-defined function comprises identifying one or more first containers that are configured to process functions in the auxiliary programming language.

23. One or more non-transitory computer storage media storing instructions that, when executed by one or more computers, cause the one or more computers to perform operations comprising:
receiving, by a distributed database system installed on a cloud computing platform, a query written in a primary query language, wherein the query calls a user-defined function;
assigning one or more primary segment hosts on the cloud computing platform to process one or more portions of the query written in the primary query language;
assigning one or more first containers to process the call to the user-defined function in the query;
providing, by the one or more primary segment hosts to the one or more first containers assigned to process the call to the user-defined function, the user-defined function and one or more arguments in the call to the user-defined function;
executing, by the one or more first containers assigned to process the call to the user defined function, the user-defined function using the arguments to the call in the user-defined function;
receiving, by the one or more primary segment hosts, an initial result of the call to the user-defined function computed by the one or more first containers;
computing, by the one or more primary segment hosts, a final result of the query using the initial result of the call to the user-defined function; and
providing the final result of the query m response to receiving the query.

* * * * *